United States Patent [19]

Kanazawa et al.

[11] Patent Number: 4,982,804
[45] Date of Patent: Jan. 8, 1991

[54] VEHICLE STEERING SYSTEM

[75] Inventors: Hirotaka Kanazawa; Yoichi Takeda; Yukio Noguchi, all of Hiroshima; Isamu Chikuma, Maebashi; Satoru Shimada, Maebashi; Kazuo Chikaraishi, Maebashi, all of Japan

[73] Assignees: Mazda Motor Corporation, Hiroshima, Japan; Nippon Seiko Kabushiki Kaisha, Tokyo, Japan

[21] Appl. No.: 315,116

[22] Filed: Feb. 24, 1989

[30] Foreign Application Priority Data

Feb. 29, 1988 [JP] Japan ................... 63-47252
Apr. 26, 1988 [JP] Japan ................... 63-103186

[51] Int. Cl.$^5$ ........................... B62D 5/06; B62D 7/14
[52] U.S. Cl. ........................................ 180/140; 280/91
[58] Field of Search ............... 180/140, 141, 142, 143, 180/234; 280/91

[56] References Cited

U.S. PATENT DOCUMENTS

| 4,572,316 | 2/1986 | Kanazawa et al. | 180/234 |
| 4,601,357 | 7/1986 | Miyoshi et al. | 280/91 |
| 4,719,981 | 1/1988 | Miyoshi | 280/91 |
| 4,730,839 | 3/1988 | Miyoshi | 280/91 |
| 4,732,231 | 3/1988 | Kanazawa et al. | 180/140 |

FOREIGN PATENT DOCUMENTS 37280 2/1987 Japan ....................... 280/91

Primary Examiner—Mitchell J. Hill
Attorney, Agent, or Firm—Sixbey, Friedman, Leedom & Ferguson

[57] ABSTRACT

Rotaton of a steering wheel is transmitted to a steering ratio changing mechanism which displaces an output displacement member according to the steering wheel turning angle to obtain a desired steering ratio. A displacment transmission member transmits the displacement of the output displacement member to a valve member of a hydraulic switching valve and a wheel turning rod is displaced under the force of a hydraulic power cylinder in response to displacement of the valve member. The displacement transmission member is operatively connected to the output displacement member, the valve member and the wheel turning rod to be operated to displace the valve member in a predetermined direction in response to a displacement of the output displacement member and to be operated to displace the valve member in the direction opposite to the predetermined direction in response to a displacement of the wheel turning rod generated by the displacement of the valve member, so that the wheel turning rod is displaced in response to displacement of the output displacement member with the valve member being hardly displaced.

19 Claims, 15 Drawing Sheets

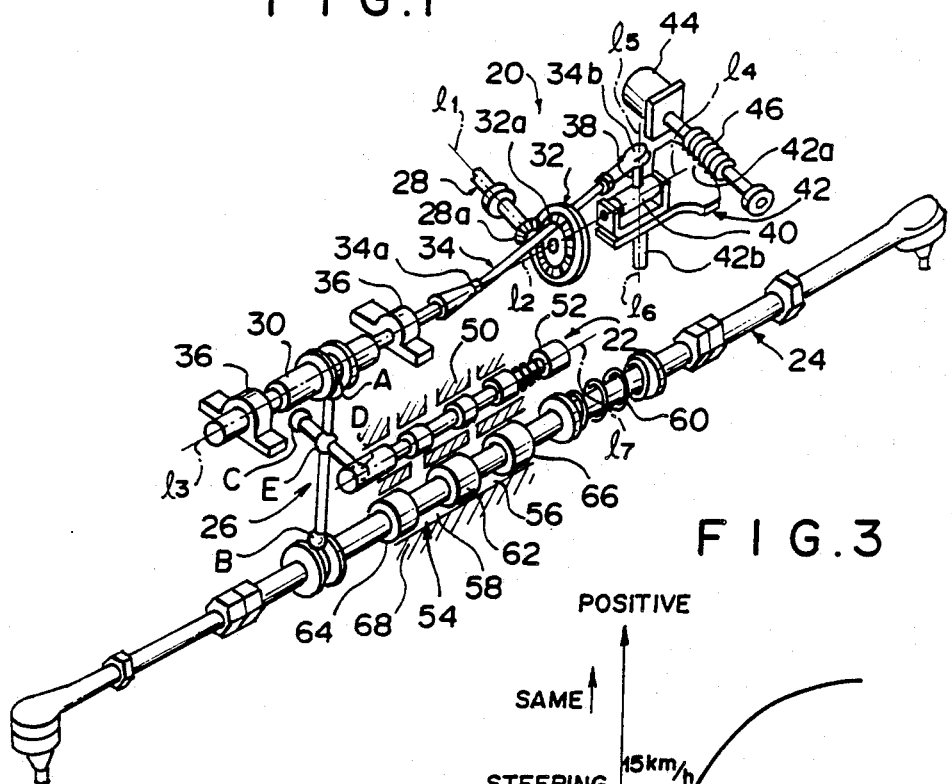
FIG. 1
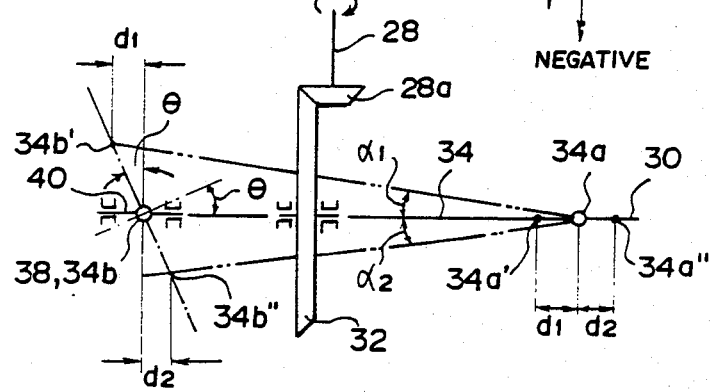
FIG. 3
FIG. 2

F I G. 5
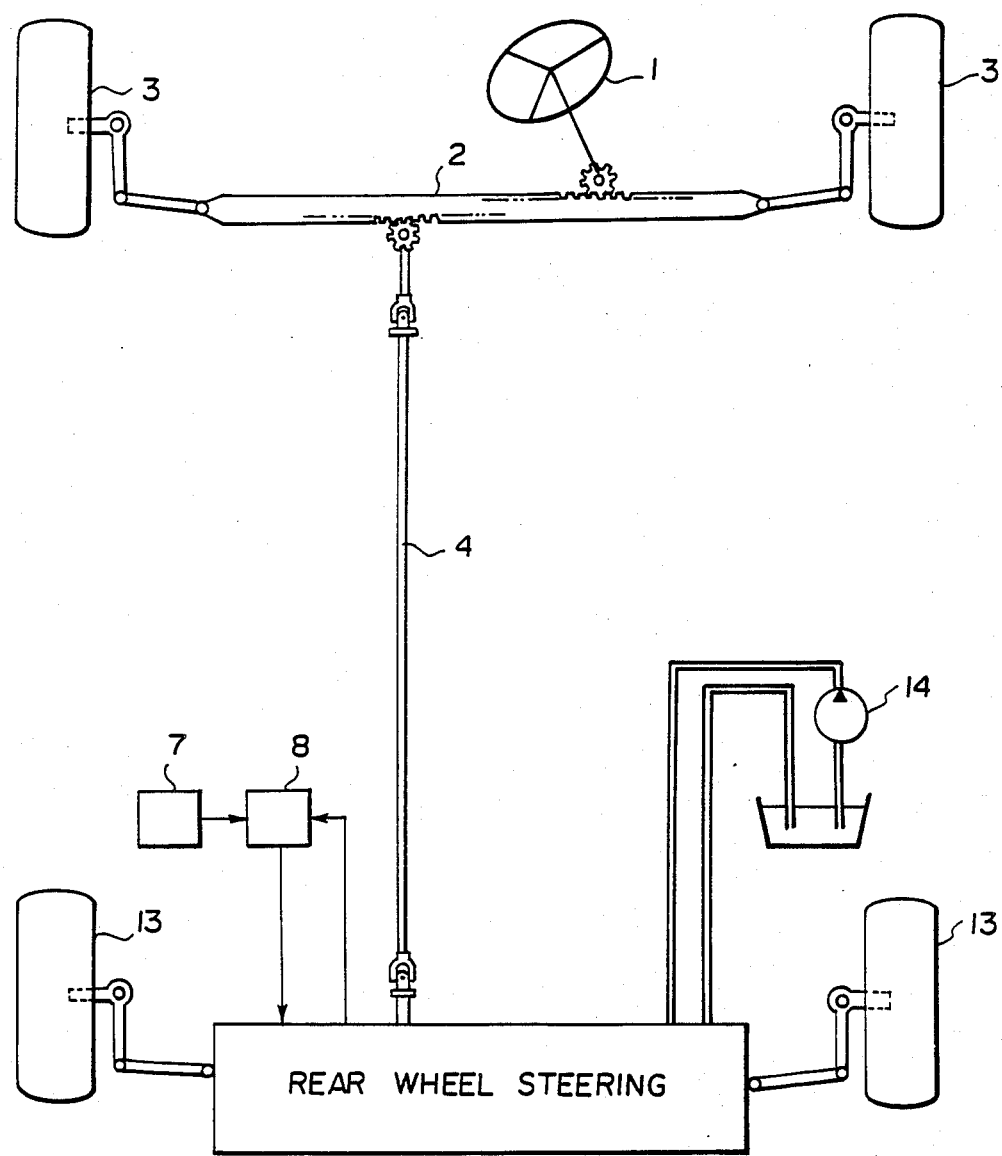

F I G. 22
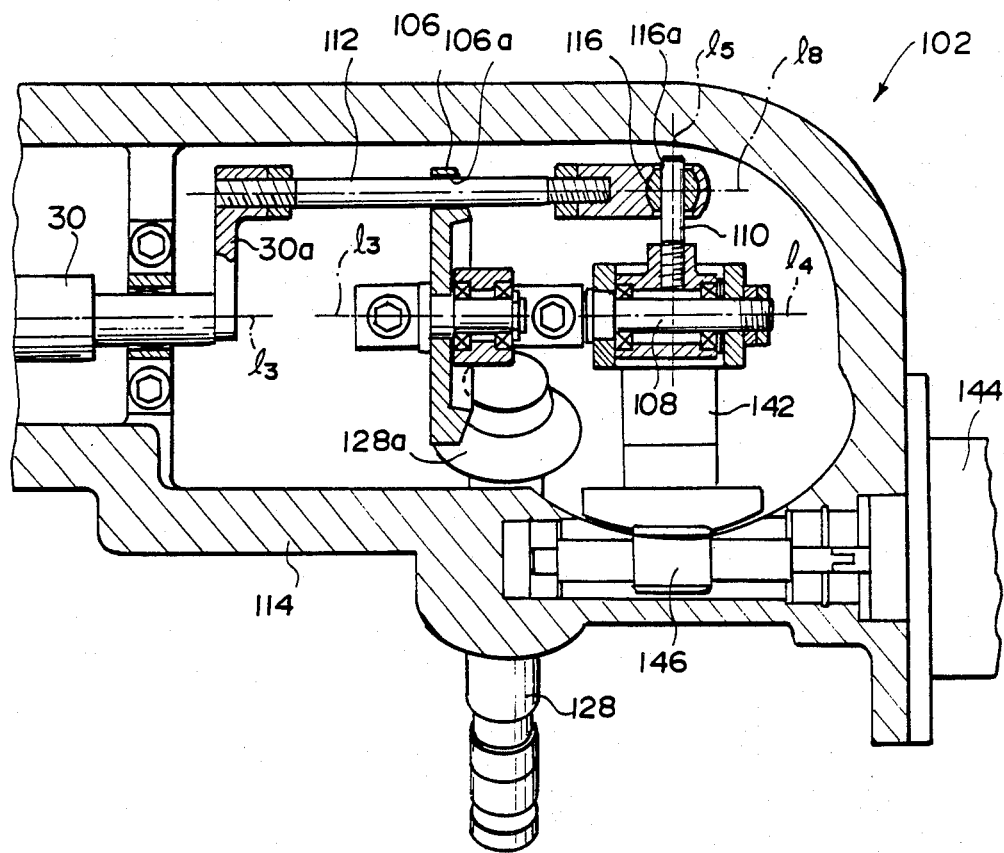

F I G. 23
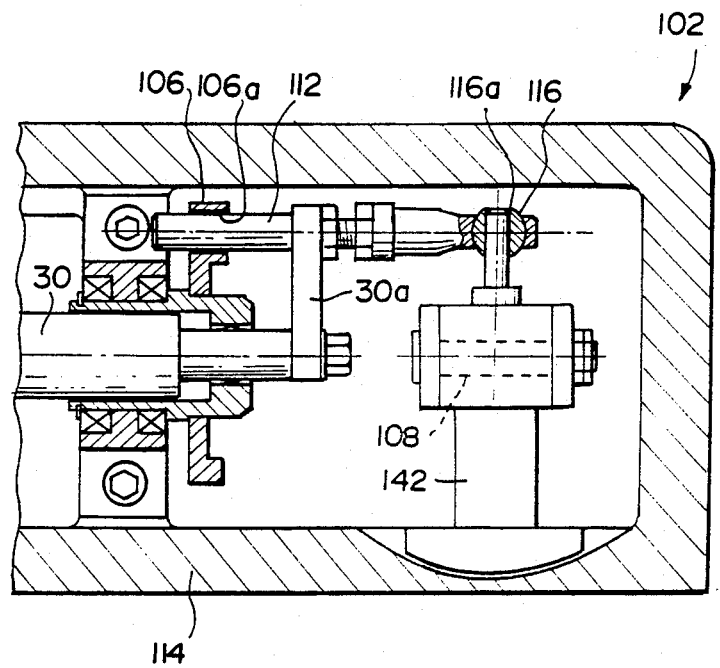

VEHICLE STEERING SYSTEM

BACKGROUND OF THE INVENTION

1. Field of the Invention

This invention relates to a steering system for a vehicle which turns wheels of the vehicle in response to operation of the steering wheel, and more particularly to a steering system for a vehicle having a hydraulic power cylinder which operates under the control of a hydraulic switching valve and turns wheels of the vehicle in response to operation of the steering wheel. The steering system of the present invention is useful, for example, for a system which turns the rear wheels in a four-wheel-steered vehicle.

2. Description of the Prior Art

As disclosed for instance, in U.S. Pat. No. 4,732,231, there has been known a four-wheel steering system in which the rear wheels are turned in response to operation of the steering wheel under the force of a hydraulic power cylinder which is controlled by a hydraulic switching valve and the rear wheel steering ratio which is the ratio of the turning angle of the rear wheels to the turning angle of the steering wheel is changed by a rear wheel steering ratio changing mechanism.

As shown in FIG. 24, in the four-wheel steering system disclosed in the above identified United States patent, a front wheel turning rod 2 is displaced in the transverse direction of the vehicle body in response to rotation of a steering wheel 1 and front wheels 3 are turned. The rotation of the steering wheel 1 is transmitted to a rear wheel steering ratio changing mechanism 5 by way of the front wheel turning rod 2 and a relay shaft 4.

The rear wheel steering ratio changing mechanism 5 has an output displacement member 5a which is displaced in the transverse direction of the vehicle body by a distance corresponding to the turning angle of the steering wheel 1. The ratio of the amount of displacement of the output displacement member 5a to the turning angle of the steering wheel 1 (This ratio corresponds to the ratio of the rear wheel turning angle to the steering wheel turning angle, and will be also referred to as "the rear wheel steering ratio".) can be changed according to the amount of rotation of a stepping motor 6. The amount of rotation of the stepping motor 6 is controlled by a control circuit 8 according to a vehicle speed signal output from a vehicle speed sensor 7. The actual amount of rotation of the stepping motor 6 is detected by a steering ratio sensor 9 and is controlled on the basis of the output of the sensor 9.

The steering wheel turning angle, the amount of displacement of the output displacement member 5a, the amount of rotation of the stepping motor 6 are values which represent not only the absolute value of the rotation or the displacement but also the direction of the rotation or the displacement, the direction of the rotation or the displacement being represented by plus or minus.

The displacement of the output displacement member 5a of the rear wheel steering ratio changing mechanism 5 is transmitted to a spool 10a of a hydraulic switching valve 10. The hydraulic switching valve 10 feeds a hydraulic pressure to a hydraulic power cylinder 11 in response to displacement of the output displacement member 5a so that a rear wheel turning rod 12 is displaced in the transverse direction of the vehicle body by an amount corresponding to the displacement of the output displacement member 5a, thereby turning rear wheels 13.

The spool 10a of the hydraulic switching valve 10 is accommodated in a valve housing 10b for displacement in the transverse direction of the vehicle body. The valve housing 10b fixed to the rear wheel turning rod 12 to be displaced in the transverse direction of the vehicle body together with the rear wheel turning rod 12. When the spool 10a is displaced, for instance, rightward from the neutral position shown in FIG. 24, a hydraulic pressure is introduced into a left hydraulic pressure chamber 11a of the power cylinder 11 by an oil pump 14 and a piston 11b fixed to the rear wheel turning rod 12 is displaced rightward under the hydraulic pressure in the left hydraulic pressure chamber 11a, whereby the rear wheel turning rod 12 is displaced rightward. The valve housing 10b is displaced rightward together with the rear wheel turning rod 12 and when the spool 10a substantially returns to the neutral position with respect to the valve housing 10b (more strictly to a balance position to be described later), introduction of the hydraulic pressure into the left hydraulic pressure chamber 11a is interrupted. When the spool 10a is further displaced rightward in this state, the rear wheel turning rod 12 is further displaced rightward by an amount corresponding to the amount of displacement of the spool 10a in the manner described above. When the spool 10a is displaced leftward, hydraulic pressure is introduced into a right hydraulic pressure chamber 11c and the rear wheel turning rod 12 is displaced leftward by an amount corresponding to the amount of the leftward displacement of the spool 10a.

However, the conventional steering system is disadvantageous in that the hydraulic switching valve part is large and heavy, thereby preventing reduction in size and weight of the overall steering system.

That is, in the hydraulic switching valve 10, a connecting portion 10c for fixing the valve housing 10b to the rear wheel turning rod 12 is formed integrally with the valve housing 10b, and the valve housing 10b is displaced together with the rear wheel turning rod 12 by the same amount as the rear wheel turning rod 12, e.g., about plus or minus 10 mm (i.e., about 10 mm leftward or rightward) from the neutral position shown in FIG. 24. The connecting portion 10c adds to the overall weight and size of the hydraulic switching valve 10, and as can be understood from the description above, a space for permitting the valve housing 10b including the connecting portion 10c to be displaced in the transverse direction of the vehicle body must be provided. Thus the size and weight of the overall steering system are increased.

SUMMARY OF THE INVENTION

In view of the foregoing observations and description, the primary object of the present invention is to provide a steering system which has an improved hydraulic switching valve and can be substantially small in weight and size.

The steering system in accordance with the present invention includes a displacement transmission means for transmitting displacement of an output displacement member of a steering ratio changing mechanism to a valve member of a hydraulic switching valve and displaces a wheel turning rod under the force of a hydraulic power cylinder in response to displacement of the valve member, and is characterized in that the displacement transmission means is operatively connected to the output displacement member, the valve member and the wheel turning rod to be operated to displace the valve member in a predetermined direction in response to a displacement of the output displacement member and to be operated to displace the valve member in the direction opposite to the predetermined direction in response to a displacement of the wheel turning rod generated by the displacement of the valve member, so that the wheel turning rod is displaced in response to displacement of the output displacement member with the valve member being hardly displaced.

In the steering system in accordance with the present invention, the wheel turning rod may be displaced solely by the hydraulic force of the power cylinder (full power type) or by combination of the steering wheel turning force transmitted to the wheel turning rod and the hydraulic force of the power cylinder (power assist type. That is, "displacement of the wheel turning rod generated by the displacement of the valve member" should be broadly interpreted to include displacement of the wheel turning rod which is generated with an assist from a hydraulic power cylinder without being limited to displacement generated solely by hydraulic force of a power cylinder.

It is first assumed that the output displacement member is displaced and the displacement transmission means is operated to displace the valve member from the neutral position in one direction by a predetermined amount. In this case, the wheel turning rod is not displaced until the valve member is displaced to a balance position. The balance position is defined to be the position of the valve member in which the hydraulic power cylinder is caused to exert a hydraulic force which balances with external forces acting on the wheel turning rod such as the force of a centering spring and the counterforce of the tires. The portion between the neutral position and the balance position is a so-called insensitive zone of the valve and is very small.

When the valve member is displaced beyond the balance position, the power cylinder is caused to exert a hydraulic force which can overcome the external forces acting on the wheel turning rod and the wheel turning rod is displaced under the hydraulic force. The displacement of the wheel turning rod causes the displacement transmission means to displace the valve member in the reverse direction. That is, the wheel turning rod is displaced until the valve member is returned to the balance position by the displacement transmission means, and is stopped there. When the output displacement member is further displaced, and the valve member is displaced again beyond the balance position in said one direction, the wheel turning rod is further displaced, whereby the valve member is returned to the balance position again in the manner described above. By repeating these operations, the wheel turning rod is displaced by an amount corresponding to the amount of displacement of the output displacement member.

That is, with the arrangement in accordance with the present invention, the wheel turning rod can be displaced by an amount corresponding to the amount of displacement of the output displacement member with slight displacement of the valve member. Said balance position changes with the external forces acting on the wheel turning rod. For example, when deformation of the centering spring is enlarged as the displacement of the wheel turning rod increases, the force of the centering spring (an external force) increases. Accordingly, as the displacement of the wheel turning rod increases, the balance position is distanced from the neutral position. However, the change in the balance position is very small as compared with the amount of displacement of the output displacement member or the like.

As can be understood from the description above, the valve member is displaced only by a very small distance between the neutral position and the balance position, and accordingly, the valve housing need not be displaced together with the wheel turning rod. Therefore, unlike in the conventional steering system, neither the connecting portion for connecting the valve housing to the wheel turning rod nor the space for permitting the valve housing including the connecting portion to be displaced in the transverse direction of the vehicle body need be provided. Thus, the steering system can be reduced in size and weight.

BRIEF DESCRIPTION OF THE DRAWINGS

FIG. 1 is a schematic perspective view showing a major part of the steering system in accordance with a first embodiment of the present invention, FIG. 2 is a view for illustrating the principle of operation of the rear wheel steering ratio changing mechanism employed in the first embodiment, FIG. 3 is a view showing an example of a control pattern on the basis of which the rear wheel steering ratio is controlled, FIG. 5 is a schematic view showing the position of the steering system in a vehicle, FIG. 22 is a cross-sectional view similar to FIG. 19 but showing another modification, FIG. 23 is a cross-sectional view similar to FIG. 19 but showing a still another modification.

DESCRIPTION OF THE PREFERRED EMBODIMENTS

Figure 24:
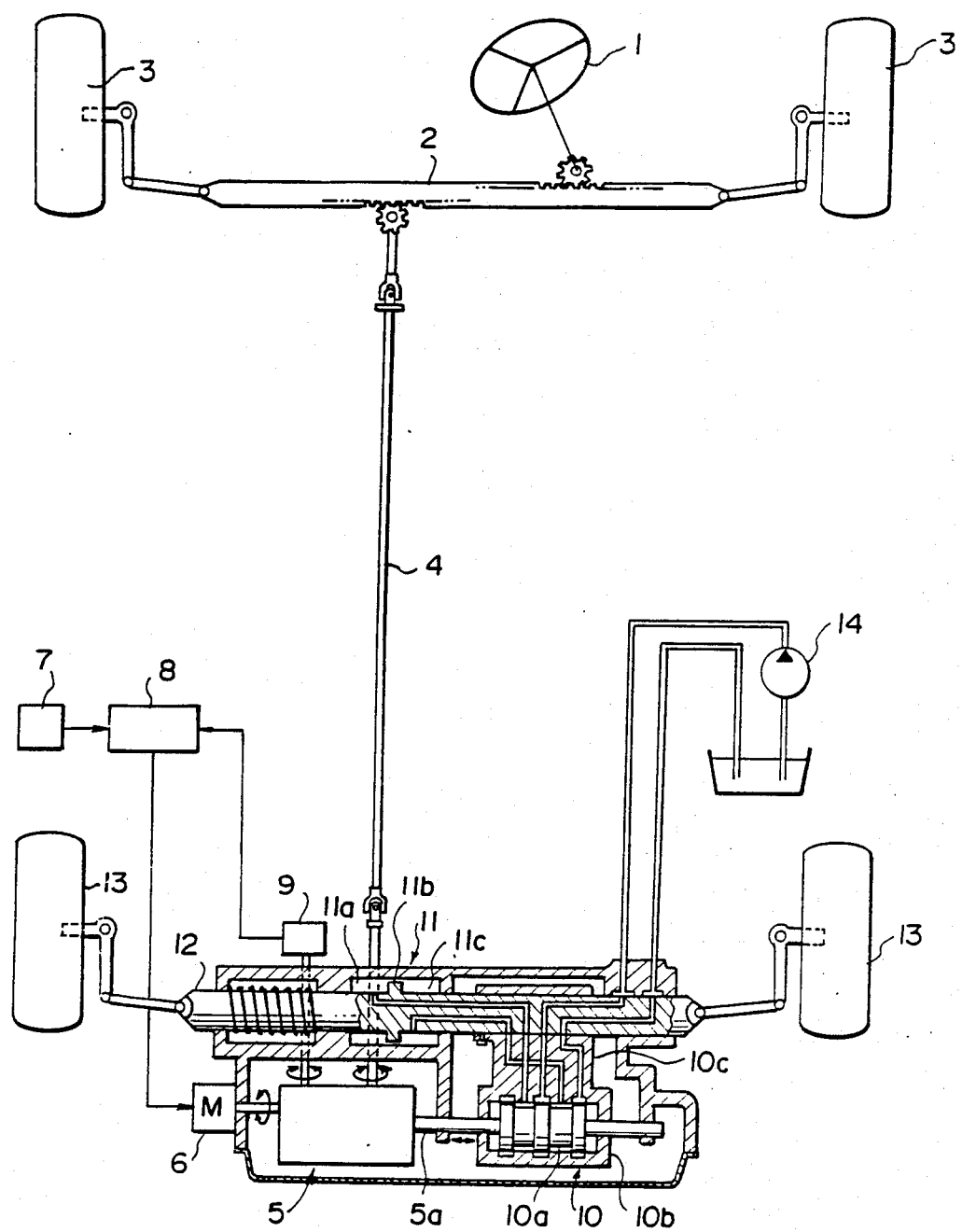
FIG. 24 is a schematic plan view showing an example of a four-wheel-steered vehicle provided with a conventional rear wheel steering system.

A first embodiment of the present invention will be described with reference to FIGS. 1 to 5. In the first embodiment, the present invention is applied to the rear wheel steering mechanism in a four-wheel-steered vehicle. That is, as shown in FIG. 5, the rear wheel steering mechanism is a mechanism which turns the rear wheels 13 under the force of a hydraulic power cylinder by an angle and in a direction, which angle and direction are determined on the basis of a predetermined four-wheel steering characteristics according to the steering wheel turning angle and the steering wheel turning direction which are input into the rear wheel steering mechanism by way of the relay shaft 4. In FIG. 5, the same reference numerals as in FIG. 24 denotes the analogous components.

The rear wheel steering mechanism in accordance with the first embodiment comprises a rear wheel steering ratio changing mechanism 20, a hydraulic switching valve 22, a rear wheel turning rod 24, a displacement transmission member 26 and a hydraulic power cylinder 54.

The rear wheel steering ratio changing mechanism 20 has an input shaft 28 to which the rotation of the steering wheel 1 (FIG. 5) is transmitted by way of the relay shaft 4. The rear wheel steering ratio changing mechanism 20 is further provided with an output displacement member 30 which is displaced in response to operation of the steering wheel 1, and controls rear wheel steering ratio which is the ratio of the rear wheel turning angle to the steering wheel turning angle and corresponds to the ratio of the amount of displacement of the output displacement member 30 to the steering wheel turning angle. The rear wheel steering ratio is a value which represents not only the absolute value of the ratio but also the turning direction of the rear wheels 13 with respect to the turning direction of the steering wheel 1 as plus or minus. That is, the rear wheel steering ratio is defined to be negative when the rear wheels 13 are turned in the direction opposite to the turning direction of the rear wheel or the turning direction of the front wheels (reverse phase) and to be positive when the rear wheels 13 are turned in the same direction as the steering wheels or the front wheels (same phase). The rear wheel steering ratio changing mechanism 20 includes a bevel gear 32 which is in mesh with a pinion 28a mounted on the rear end of the input shaft 28 and rotates about a rotational axis $l_2$ which extends in perpendicular to the rotational axis $l_1$ of the pinion 28a, i.e., in the transverse direction of the vehicle body. The bevel gear 32 has a rod support hole 32a formed at a portion offset from the rotational axis $l_2$, and a connecting rod 34 is inserted into the rod support hole 32a to be rotatable relative to the bevel gear 32 and to be slidable in the axial direction thereof.

A first end 34a of the connecting rod 34 is connected to the output displacement member 30 by way of a ball joint. The output displacement member 30 is supported by a support member 36 to be slidable only in the direction of its longitudinal axis $l_3$. A second end 34b or the other end of the connecting rod 34 is connected to one end of a swinging arm 38 by way of a ball joint. The swinging arm 38 is fixed to a pivot shaft 40 at the other end for rotation about the longitudinal axis $l_4$ of the pivot shaft 40 which extends in perpendicular to the swinging arm 38. The longitudinal axis $l_4$ of the pivot shaft 40, the rotational axis $l_2$ of the bevel gear 32 and the longitudinal axis $l_3$ of the output displacement member 30 are in alignment with each other in the transverse direction of the vehicle body. The pivot shaft 40 is fixed to a gear member 42, which has a gear portion 42a in mesh with a worm 46 rotated by a stepping motor 44 and is rotated about a shaft 42b in response to rotation of the worm 46. The longitudinal axis $l_5$ of the swinging arm 38 and the longitudinal axis $l_6$ of the shaft 42b are in alignment with each other.

Rotation of the steering wheel 1 is transmitted from the input shaft 28 to the bevel gear 32 through the pinion 28a and the output displacement member 30 is axially displaced by rotation of the bevel gear 32. Though the turning angle of the bevel gear 32 for given turning angle of the steering wheel 1 is fixed, the amount and the direction of the displacement of the output displacement member 30 are changed when the pivot shaft 40 is rotated about the longitudinal axis $l_6$ of the shaft 42b. That is, when the pivot shaft 40 is inclined, the ratio of the amount of displacement of the output displacement member 30 to the steering wheel turning angle, i.e., the rear wheel steering ratio, is changed.

The change in the rear wheel steering ratio will be described in detail with reference to FIG. 2. When the bevel gear 32 is rotated while the pivot shaft 40 extends in the transverse direction of the vehicle body and the longitudinal axis $l_4$ of the pivot shaft 40 is in alignment with the rotational axis $l_2$ of the bevel gear 32, the connecting rod 34 extending along the rotational axis $l_2$ of the bevel gear 32 moves on a conical surface which has its apex on the first end 34a of the connecting rod 34 and the swinging arm 38 is rotated on the base of the cone. In this case, the first end 34a of the connecting rod 34 is not moved. That is, the rear wheels 13 are not turned even if the steering wheel 1 is turned and the front wheels 3 are turned. When the stepping motor 44 is rotated to incline the pivot shaft 40 in a counterclockwise direction by an angle $\theta$, the surface on which the swinging arm 38 connects is inclined by the angle $\theta$ with respect to the base of the cone. Accordingly when the bevel gear 32 is rotated to a position where the angle between the rotational axis $l_2$ of the bevel gear 32 and the connecting rod 34 is $\alpha_1$, the second end 34b of the connecting rod 34 is moved leftward by a distance $d_1$ to the position indicated at 34b' in FIG. 2 and accordingly, the first end 34a of the connecting rod 34 is moved leftward by the same distance to the position indicated at 34a', whereby the output displacement member 30 is displaced leftward. On the other hand, when the bevel gear 32 is rotated in the reverse direction to a position where the angle between the rotational axis $l_2$ of the bevel gear 32 and the connecting rod 34 is $\alpha_2$, the second end 34b of the connecting rod 34 is moved rightward by a distance $d_2$ to the position indicated at 34b'' in FIG. 2 and accordingly, the first end 34a of the connecting rod 34 is moved rightward by the same distance to the position indicated at 34a'', whereby the output displacement member 30 is displaced rightward. The distance $d_1$ or $d_2$ for a given rotating angle of the bevel gear 32, i.e., for a given steering wheel turning angle, changes with the angle $\theta$. That is, the rear wheel steering ratio determined by the ratio of the amount of displacement of the output displacement member 30 to the steering wheel turning angle can be changed by changing the angle $\theta$ of inclination of the pivot shaft 40. When the pivot shaft 40 is clockwisely inclined, the first end 34a of the connecting rod 34 is moved in the direction opposite to the direction described above. That is, the rear wheels 13 can be turned either in the same direction as the front wheels or the steering wheel or in the direction opposite to the front wheels or the steering wheel by controlling the inclination of the pivot shaft 40.

The rear wheel steering ratio may be changed according to various factors on the basis of various changing pattern. In this particular embodiment, the rear wheel steering ratio is set to be negative (the reverse phase) in a low vehicle speed range in order to improve the cornering performance and to be positive (the same phase) in a high vehicle speed range in order to improve the running stability as shown in FIG. 3. The front wheels 3 are constantly turned in the same direction as the steering wheel 1. As in the conventional system, the rear wheel steering ratio changing pattern is stored in a control unit (not shown), and the control unit drives the stepping motor 44 to rotate in a direction and by an amount which are required to obtain a rear wheel steering ratio determined on the basis of the rear wheel steering ratio changing pattern according to the vehicle speed input into the control unit from a vehicle speed sensor (not shown). The actual rear wheel steering ratio is detected by a steering ratio sensor (not shown) through the angular position of the shaft 42b of the gear member 42, and the detecting signal of the steering ratio sensor is input into the control unit in order to effect feedback control.

The hydraulic switching valve 22 comprises a valve housing 50 and a spool 52 (valve member) which is accommodated in the valve housing 50 to be slidable along its longitudinal axis $l_7$ parallel to the longitudinal axis $l_3$ of the output displacement member 30. The spool 52 is displaced by the output displacement member 30 and the rear wheel turning rod 24 by way of the displacement transmission member 26 which will be described in detail later. According to the displacement of the spool 52, hydraulic pressure to be fed to the hydraulic power cylinder 54 is controlled. That is, the hydraulic power cylinder 54 has right and left oil chambers 56 and 58. When the spool 52 is displaced rightward from the neutral position with respect to the valve housing 50, the hydraulic pressure is fed to the right oil chamber 56 and when the spool 52 is displaced leftward, the hydraulic pressure is fed to the left oil chamber 58.

The rear wheel turning rod 24 extends in the transverse direction of the vehicle body in parallel to the longitudinal axis $l_3$ of the output displacement member 30 and is displaced under the hydraulic pressure in the hydraulic power cylinder 54 in the transverse direction of the vehicle body to turn the rear wheels 13 by way of the tie rods and the knuckle arms. The rear wheel turning rod 24 is provided with a centering spring 60 which returns the rear wheel turning rod 24 to the neutral position where the rear wheels 13 are held in the straight-ahead position in the case where the hydraulic pressure in the hydraulic power cylinder 54 is released. In case of failure in the hydraulic system including the hydraulic switching valve 22 and hydraulic power cylinder 54, the hydraulic pressure in the hydraulic power cylinder 54 can be released. Further, in case of failure in the rear wheel steering system, the control unit drains the hydraulic system to release the hydraulic pressure in the hydraulic power cylinder 54. That is, a fail-safe mechanism is operated.

A piston 62 is fixed to the rear wheel turning rod 24 to be slidable in the hydraulic power cylinder 54, and seal members 64 and 66 are fixed to the housing 68 of the hydraulic power cylinder 54, whereby the right and left oil chambers 56 and 58 are defined right and left of the piston 62. The seal members 64 and 66 are slidable with respect to the rear wheel turning rod 24. The displacement transmission member 26 is operatively connected to the output displacement member 30, the spool 52 and the rear wheel turning rod 24 to be operated to displace the spool 52 in a predetermined direction in response to a displacement of the output displacement member 30 and to be operated to displace the spool 52 in the direction opposite to the predetermined direction in response to a displacement of the rear wheel turning rod 24 generated by the displacement of the spool 52.

In this particular embodiment, the displacement transmission member 26 is in the form of a cross lever comprising a longitudinal lever and a transverse lever. One end A of the longitudinal lever is engaged with the output displacement member 30 and the other end B of the longitudinal lever is engaged with rear wheel turning rod 24. One end C of the transverse lever is engaged with a casing of the rear wheel steering mechanism fixed to the vehicle body and the other end of the transverse lever is engaged with the spool 52. The ends A, B and D cannot be moved with respect to the output displacement member 30, the rear wheel turning rod 24 and the spool 52 in the direction of the respective longitudinal axes though movable in the other directions and rotatable. The end C is engaged with the casing by way of a ball joint to be rotatable but not to be movable with respect to the casing.

Figure 4A:
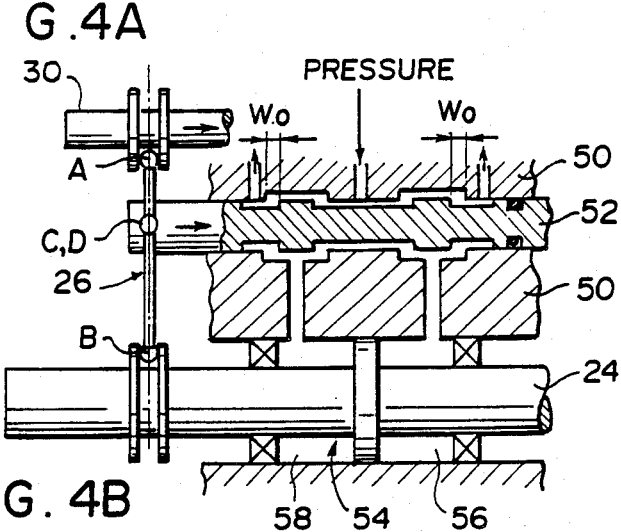
FIGS. 4A to 4C are views for illustrating the operation of the displacement transmission member, the output displacement member, hydraulic switching valve and the rear wheel turning rod.
Figure 4B:
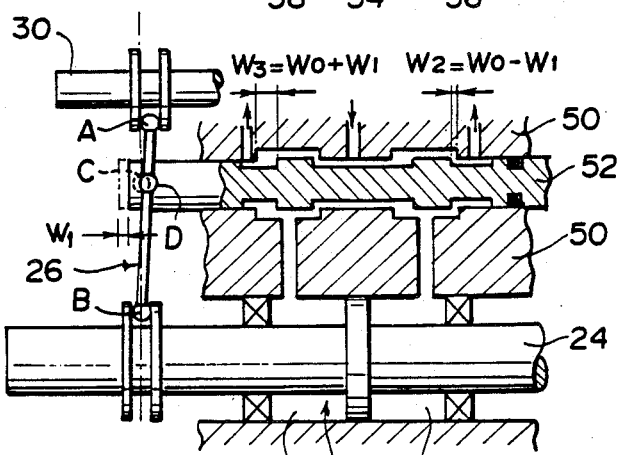
Figure 4C:
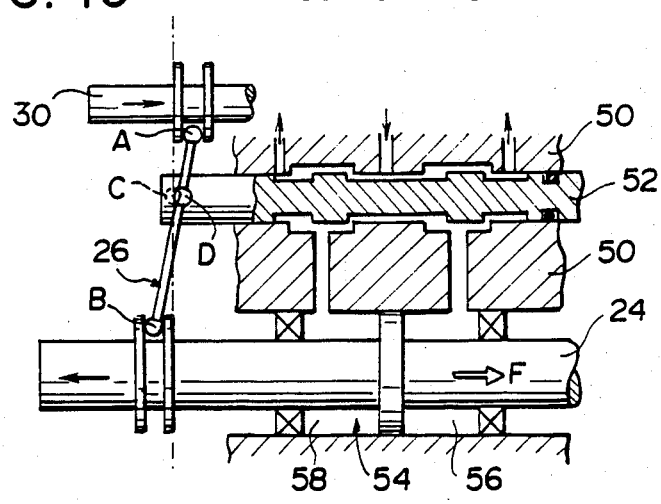

Operation of the steering system in accordance with this embodiment will be described with reference to FIGS. 4A to 4C, hereinbelow. FIG. 4A shows a state where both the spool 52 and the rear wheel turning rod 24 are in the neutral position as in FIG. 1. When the output displacement member 30 is displaced rightward in this state, the end A of the displacement transmission member 26 is displaced rightward along with the output displacement member 30 and the displacement transmission member 26 is inclined about a line joining the end C and the end D as shown in FIG. 4B since the end B cannot be moved in the longitudinal direction of the rear wheel turning rod 24 due to the external forces acting on the rear wheel turning rod 24 such as the counterforces of the tires and the centering spring 60 and the end C is fixedly connected to the casing as described above. This causes the end D to displace the spool 52 rightward.

In the state shown in FIG. 4A, the effective cross-sectional area of the oil return passage for the right oil chamber 56 is equal to that for the left oil chamber 58, and the cross-sectional area of the oil return passages at this time is indicated at $W_0$ in FIG. 4A. When the spool 52 is displaced rightward from the neutral position, the effective cross-sectional area of the oil return passage for the left oil chamber 58 is enlarged and that for the right oil chamber 56 is reduced, whereby the hydraulic pressure in the right oil chamber 56 is increased and the hydraulic pressure in the left oil chamber 58 is reduced. Accordingly a hydraulic pressure urging the rear wheel turning rod 24 to the left is produced. The hydraulic pressure is increased as the amount of rightward displacement of the spool 62 increases.

When the spool 52 is displaced from the neutral position to the balance position shown in FIG. 4B, where the effective cross-sectional area of the oil return passage for the left oil chamber 58 is enlarged by $W_1$ to $W_3$ ($W_3 = W_0 + W_1$) and that for the right oil chamber 56 is reduced by $W_1$ to $W_2$ ($W_2 = W_0 - W_1$), the hydraulic pressure produced due to the difference between the effective cross-sectional areas balances with the external forces acting on the rear wheel turning rod 24.

When the spool 52 is further displaced from the position shown in FIG. 4B, the effective area of the oil return passage for the right oil chamber 56 is further reduced to be smaller than $W_2$, and that for the left oil chamber 58 is further enlarged to be larger than $W_3$, whereby the hydraulic pressure produced due to the difference between the effective cross-sectional areas becomes larger than the external forces acting on the rear wheel turning rod 24 and the rear wheel turning rod 24 is displaced to the left.

When the rear wheel turning rod 24 is displaced to the left, the end B of the displacement transmission member 26 is displaced to the left together with the rear wheel turning rod 24. Since the end A cannot be moved due to the external forces acting on the output displacement member 30 such as the counterforces of the front tires and the steering wheel turning force and the end C is fixedly connected to the casing as described above, the displacement transmission member 26 is inclined about the line joining the end A and the end C as shown in FIG. 4C in response to the leftward displacement of the end B. That is, the displacement transmission member 26 returns the spool 52 to the left, and when the spool 52 returns to the balance position shown in FIG. 4C, the rear wheel turning rod 24 is stopped.

When the output displacement member 30 is further displaced rightward to displace the spool 52 rightward, the rear wheel turning rod 24 is displaced leftward in the similar manner until the spool 52 is returned to the balance position. By repeating these operations, the rear wheel turning rod 24 is displaced by an amount corresponding to the amount of displacement of the output displacement member 30 and the rear wheels 13 are turned by an angle corresponding to the amount of displacement of the rear wheel turning rod 24. The balance position of the spool 52 changes with the external forces described above, and when the rear wheel turning rod 24 is displaced, for instance leftward, the centering spring 60 is deformed to increase the external forces, and accordingly, the balance position is moved rightward from the position shown in FIG. 4B. However, the amount of movement of the balance position is very small. For example, the rear wheel turning rod 24 is displaced from the neutral position by about 10 mm at the maximum, while the balance position at the time when the rear wheel turning rod 24 is displaced to the maximum is spaced from the neutral position only by about 1 mm.

Operation of the steering system of this embodiment when the output displacement member 30 is displaced leftward will be apparent to those skilled in the art from the description above and accordingly will not be described here.

As can be understood from the description above, in the steering system of this embodiment, the valve housing 50 of the hydraulic switching valve 22 is stationary, and no connecting portion for connecting the valve housing 50 to the rear wheel turning rod 24 is necessary. Further, though the spool 52 is displaced by the output displacement member 30, the amount of the displacement is very small and is generally about 1 mm left and right from the neutral position since the spool 52 is returned to the balance position immediately after it is displaced beyond the balance position.

Accordingly, the steering system of this embodiment can be small in size and weight as compared with the conventional system described above in which the connecting portion for connecting the valve housing to the rear wheel turning rod and the spool is displaced by a large amount, e.g., 10 mm left and right from the neutral position.

Further, as in the conventional steering system, a desired steering condition can be maintained in the system of this embodiment even if the external forces acting on the rear wheel turning rod 24 change. For example, assuming that an additional external force F acts on the rear wheel turning rod 24 through the rear wheels 13 when the steering system is in the state shown in FIG. 4C (In this state, the hydraulic force produced by the hydraulic power cylinder 54 balances with the external forces acting on the rear wheel turning rod 24.), and the rear wheel turning rod 24 is displaced rightward, the displacement transmission member 26 is inclined about the end A to displace the end D rightward, whereby the spool 52 is displaced rightward, and accordingly, the hydraulic pressure in the right oil chamber 56 is increased and the hydraulic pressure in the left oil chamber 58 is reduced, thereby returning the rear wheel turning rod 24 to the original position. That is, when the rear wheel turning rod 24 is displaced by change in the external forces, the hydraulic pressure force produced by the hydraulic power cylinder 54 is automatically corrected and the rear wheel turning rod 24 is returned to the original position without affecting the output displacement member 30 or the steering wheel 1.

More concrete embodiment (a second embodiment) of the present invention will be described with reference to FIGS. 6 to 8, hereinbelow.

The basic arrangement of this embodiment is similar to that of the embodiment described above, and accordingly, the parts analogous to the parts shown in FIG. 1 are given the same reference numerals and will not be described in detail here.

In the second embodiment, the rear wheel steering system is provided with a casing 70. The casing 70 is fixed to the vehicle body (not shown), and the rear wheel steering ratio changing mechanism 20, the hydraulic switching valve 22, the rear wheel turning rod 24, the displacement transmission member 26 and the hydraulic power cylinder 54 are incorporated in the casing 70. The hydraulic switching valve 22 is formed by forming a hole in the casing 70 and disposing the spool 52 in the hole. That is, the valve housing 50 is formed by the casing 70 itself. Further, the rear wheel turning rod 24 is also disposed in a hole formed in the casing 70, and the housing 68 of the hydraulic power cylinder 54 is formed by the casing 70 itself.

Since the spool 52 is displaced only by about 1 mm left and right of the neutral position as described above, the hydraulic switching valve 22 is arranged to permit only a very small displacement of the spool 52, thereby, reducing the hydraulic switching valve part in size.

Preferably, the hydraulic switching valve 22 and the hydraulic power cylinder 54 are disposed as near as possible, and more preferably they are opposed to each other. With this arrangement, the overall system can be further reduced in size and the formation of the oil passages can be facilitated. In the case of the conventional steering system shown in FIG. 24, the valve housing of the hydraulic switching valve must be connected with the rear wheel turning rod and since the rear wheel turning rod is enclosed by the cylinder at the part of the cylinder, the connecting portion must be connected to the rear wheel turning rod at portion longitudinally spaced from the hydraulic power cylinder. Therefore, the hydraulic switching valve must be disposed spaced from the hydraulic power cylinder in the longitudinal direction of the rear wheel turning rod. This makes the overall steering system cumbersome and makes it difficult to form the oil passages.

On the other hand, in accordance with the present invention, the valve housing 50 of the hydraulic switching valve 22 is not moved, and accordingly, the valve housing 50 can be formed by the casing 70 and the hydraulic switching valve 22 can be opposed to the hydraulic power cylinder 54. By so arranging the hydraulic switching valve 22 and the hydraulic power cylinder 54, by forming the housings 50 and 68 by the casing itself and by forming the oil passages between the hydraulic switching valve 22 and the hydraulic power cylinder 54 as shown in FIG. 7, the overall system is reduced in size and the oil passages are easily formed.

The displacement transmission member 26 in this particular embodiment is in the form of a cross lever formed by connecting a longitudinal lever 26a and a transverse lever 26b which are separately formed. The longitudinal lever 26a and the transverse lever 26b are connected by fitting the transverse lever 26b in a hole formed in the longitudinal lever 26a. The transverse lever 26b may be fitted into the hole of the longitudinal lever 26a to be fixed thereto, or to be rotatable about its longitudinal axis and to be slidable in its axial direction.

Figure 7:
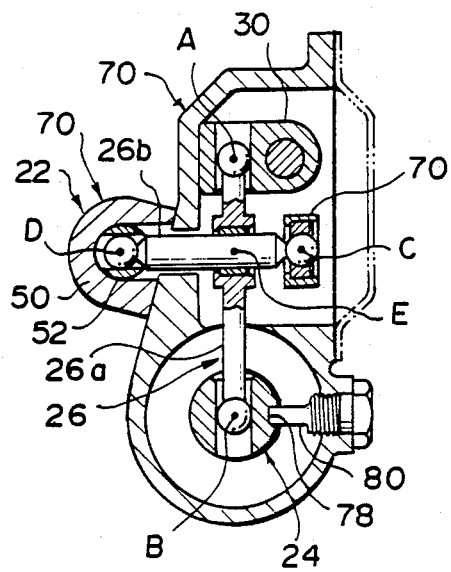
FIG. 7 is a cross-sectional view taken along line VII—VII in FIG. 6.
Figure 8:
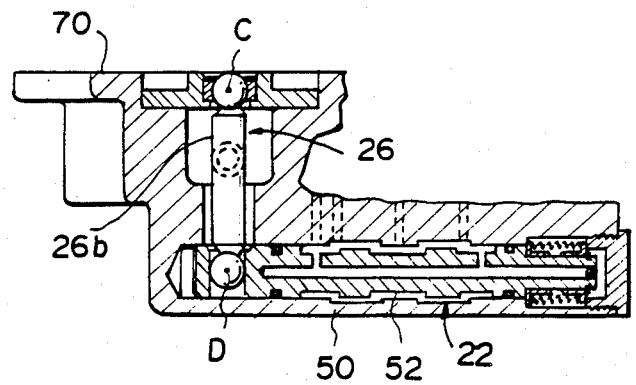
FIG. 8 is a cross-sectional view taken along line VIII—VIII in FIG. 6.
Figure 10:
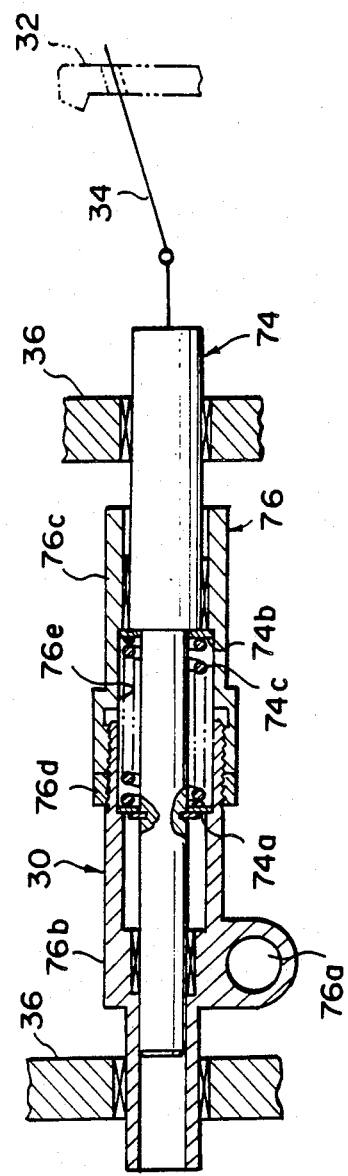
FIG. 10 is a cross-sectional view showing the transmission displacement absorbing mechanism employed in the second embodiment.

The length between the end A and the junction E of the longitudinal lever 26a and the transverse lever 26b is larger than the length between the junction E and the end B, i.e., AE<EB, as can be seen from FIG. 7. By making the length EB longer than the length AE, the axial displacement of the rear wheel turning rod 24 can be made longer than the axial displacement of the output displacement member 30.

Figure 9:
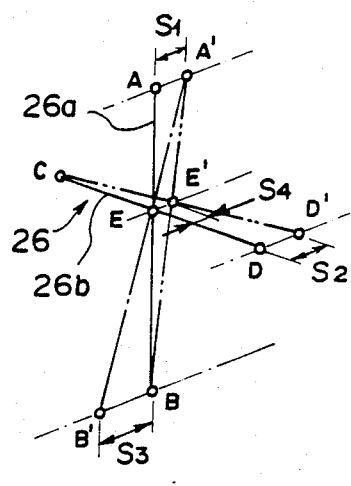
FIG. 9 is a schematic perspective view for illustrating the operation of the displacement transmission member employed in the second embodiment.

That is, as shown in FIG. 9 which is an enlarged schematic view for illustrating the operation of the displacement transmission member 26, when the displacement transmission member 26 is displaced by the output displacement member 30 from the balance position shown by the solid line to a position where the end A is spaced rightward from the original position by a distance $S_1$ as indicated at A', the displacement transmission member 26 is positioned as shown by the double chain line, and the end D is displaced by a distance $S_2$ as indicated at D', whereby the spool 52 is displaced rightward by a distance $S_2$. This causes the rear wheel turning rod 24 to move leftward until the spool 52 is returned to the balance position. That is, the end B is displaced by a distance $S_3$ to the position indicated at B' as shown by a single chain line in FIG. 9. (Though the latter balance position is not strictly the same as the former balance position as described above, the difference therebetween is very small as compared with the displacements of the output displacement member 30 and the rear wheel turning rod 24 herein discussed. Accordingly, the difference between the former and the latter is neglected in FIG. 9.) In this case, $S_1:S_3=A\text{-}E:EB$, and accordingly, by making the length EB larger than the length AE, the distance $S_3$ for a given distance $S_1$ can be enlarged.

By making the axial displacement of the rear wheel turning rod 24 larger than the axial displacement of the output displacement member 30 in this manner, the displacement of the output displacement member 30 required to obtain a given axial displacement of the rear wheel turning rod 24. This contributes to reduction in size of the rear wheel steering ratio changing mechanism 20. For example, the diameter of the bevel gear 32 can be reduced.

The transverse lever 26b of the displacement transmission member 26 also functions as a displacement amplifying mechanism. That is, one end C of the transverse lever 26b is connected to the casing 70 by way of a ball joint or the like to be rotatable but not to be displaced, the other end of the transverse lever 26b is connected to the spool 52 and the lengths EB, AB, CD and CE are selected to satisfy the following formula.

$$(EB/AB)\times(CD/CE)>1$$

With this arrangement, the output signal $S_1$ of the rear wheel steering ratio changing mechanism 20 is amplified and transmitted to the spool 52. That is, the displacement $S_2$ of the spool 52 is larger than the displacement $S_1$ of the output displacement member 30.

Generally, there exists in a hydraulic switching valve an insensitive zone where the valve does not function even if the valve member is displaced with respect to the valve housing (the zone between the neutral position and the balance position). Also in this steering system, the rear wheel turning rod 24 is not displaced at once when the output displacement member 30 begins to be displaced, and there is a time lag before the rear wheel turning rod 24 begins to be displaced after the output displacement member 30 begins to be displaced.

The time lag can be shortened by the use of a displacement amplifying mechanism such as one described above. That is, the rate of displacement of the spool 52 is increased by the displacement amplifying mechanism as compared with the case where the displacement of the output displacement member 30 is transmitted to the spool as it is, and accordingly, the spool 52 can pass the insensitive zone in a shorter time, thereby shortening the time lag.

Figure 6:
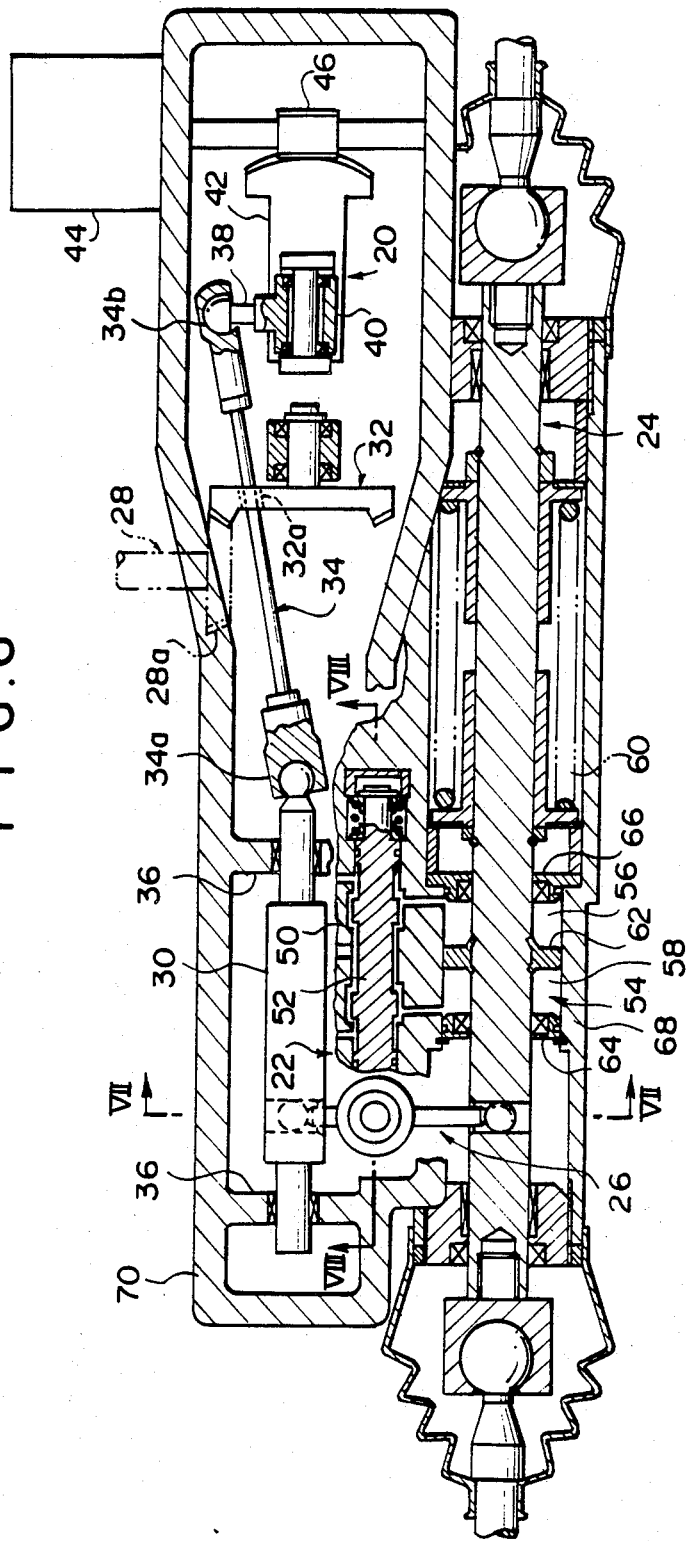
FIG. 6 is a cross-sectional view of a second embodiment of the present invention.

The steering system in accordance with the second embodiment shown in FIG. 6 is provided with a transmission displacement absorbing mechanism in the output displacement member 30.

In FIG. 9, the output displacement member 30 per se forms the transmission displacement absorbing mechanism. That is, the output displacement member 30 includes a shaft member 74 which is supported for axial displacement by a support 36 formed integrally with the casing 70, and a tubular member 76. The shaft member 74 is connected to the connecting rod 34 by way of a ball joint and is fitted in the tubular member 76 for axial displacement. The tubular member 76 comprises a first portion 76b which has an engagement portion 76a to be engaged with the end A of the displacement transmission member 26, a second portion 76c screwed on the first portion 76b, and a lock nut 76d. The tubular member 76 is formed with a larger inner diameter portion 76e, and the shaft member 74 is provided with a pair of spring seats 74a and 74b and a spring 74c disposed between the spring seats 74a and 74b. The spring seats 74a and 74b are urged outward by the spring 74c to abut against shoulders and retainers provided on the outer surface of the shaft member 74 and against shoulders formed on the inner surface of the tubular member 76 at opposite ends of the larger inner diameter portion 76e.

When an axial displacement is transmitted to the shaft member 74 from the connecting rod 34, the axial displacement is normally transmitted to the tubular member 76 by way of the spring seats 74a and 74b, the spring 74c, the shoulders of the larger inner diameter portion 74e, and then transmitted to the end A of the displacement transmission member 26 in engagement with the engagement portion 76a. On the other hand, movement of the end A of the displacement transmission member 26 is restrained and load heavier than the preset spring force of the spring 74c comes to act on the tubular member 76 upon displacement of the shaft member 74, the displacement of the shaft member 74 is absorbed by contraction of the spring 74 and is not transmitted to the tubular member 76.

In the steering system of this embodiment, a centering spring 60 for a fail-safe mechanism is provided as in the first embodiment. In case of failure, the hydraulic pressure in the hydraulic power cylinder 54 is released and the rear wheel turning rod 24 is held in the neutral position under the force of the centering spring 60 which is, for instance, several hundred Kg, and the spool 52 is arranged to be movable only about 1 mm left and right from the neutral position, and the spool 52 is operatively connected to the steering wheel 1 by way of a mechanical steering force transmitting system with the rear wheel steering ratio changing mechanism 20 included. Accordingly, in case of failure, since the rear wheel turning rod 24 cannot be displaced though the spool 52 is displaced in response to operation of the steering wheel 1, the spool 52 cannot be returned to the balance position by the rear wheel turning rod 24 and accordingly, the spool 52 is displaced over the acceptable amount of displacement, i.e., ±1 mm, in response to further operation of the steering wheel 1. This can lead to damage in the mechanical steering force transmitting system and/or the hydraulic switching valve 22 due to overloading.

Said transmission displacement absorbing mechanism is for preventing damage in the mechanical steering force transmitting system and/or the hydraulic switching valve 22 by absorbing the displacement to be transmitted in case that an overload heavier than a predetermined value is generated in the steering force transmitting mechanism.

Further, in the second embodiment shown in FIG. 6, the rear wheel turning rod 24 is provided with a long groove 78 extending in the longitudinal direction thereof as shown in FIG. 7, and an end portion of a bolt 89 screwed into the casing 70 is engaged with the long groove 78, whereby rotation of the rear wheel turning rod 24 about its longitudinal axis is prevented though axial displacement of the rear wheel turning rod 24 is permitted. Further, the output displacement member 30 is arranged to slide on the inner surface of the casing 70 maintaining a face-to-face contact therewith, thereby preventing the rotation about its longitudinal axis while permitting axial displacement thereof.

Further, the ends A,B and D of the displacement transmission member 26 are ball-like in shape in the second embodiment shown in FIG. 6, and the ball-like ends A, B and D are respectively fitted into holes which are formed in the output displacement member 30, the rear wheel turning rod 24 and the spool 52 and are directed toward the junction E in perpendicular to the longitudinal axes of the corresponding members. In this manner, these ends are engaged with the corresponding members not to be movable in the longitudinal directions of the corresponding members and to be rotatable and movable in perpendicular to the longitudinal directions of the corresponding members.

The displacement transmission member 26 in the form of a cross lever may be arranged so that the ends A,B and D are respectively connected to the corresponding members 30, 24 and 52 by way of ball joints only to be rotatable in the manner similar to the end C while the levers 26a and 26b are made to be telescopic.

Figure 11:
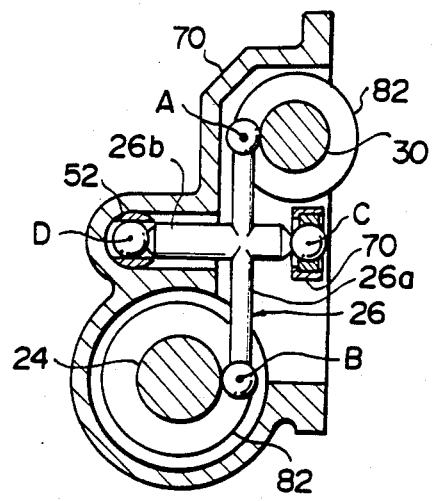
FIG. 11 is a cross-sectional view similar to FIG. 7 but showing a third embodiment of the present invention.

Further, in the case of the embodiment shown in FIG. 11, each of the output displacement member 30 and the rear wheel turning rod 24 is provided with a pair of collars 82 (only one of them is shown in FIG. 11) fixedly mounted thereon, and the ball-like ends A and B of the displacement transmission member 26 are engaged between the collars 82 to abut against both the collars 82.

Figure 12:
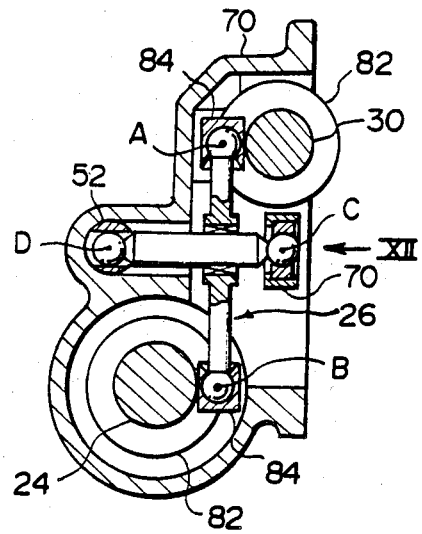
FIG. 12 is a cross-sectional view similar to FIG. 7 but showing a fourth embodiment of the present invention.
Figure 13:
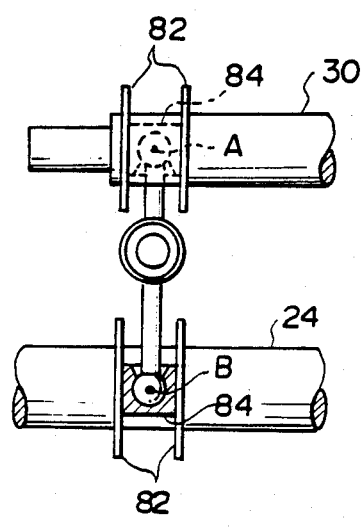
FIG. 13 is a view as viewed in the direction of arrow XIII in FIG. 12.

In the embodiment shown in FIGS. 12 and 13, each of the output displacement member 30 and the rear wheel turning rod 24 is provided with a pair of collars 82, and a slider 84 is disposed between the collars 82 to be slid with the side surfaces in contact with the collars 82. The ends A and B are connected to the sliders 84 by way of ball joints.

Though, in the embodiment shown in FIG. 6, the displacement transmission member 26 is formed by connecting the levers 26a and 26b which are separately formed, the levers 26a and 26b may be formed integrally with each other as shown in FIG. 11.

Figure 14:
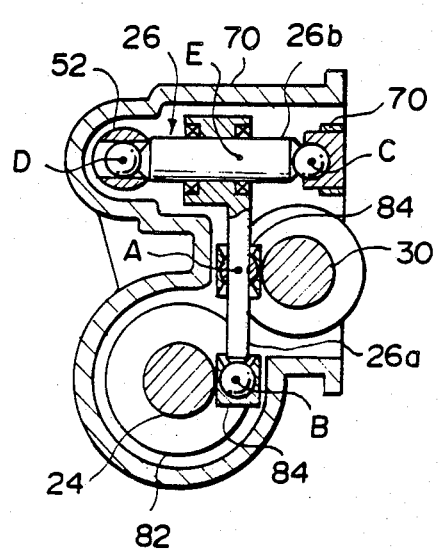
FIG. 14 is a cross-sectional view similar to FIG. 7 but showing a fifth embodiment of the present invention.

The displacement transmission member 26 may be in the form of a T-shaped lever as shown in FIG. 14. In the embodiment shown in FIG. 14, one end C of the transverse lever 26b is connected to the casing 70 and the other end of the transverse lever 26b is connected to the spool 52. One end of the longitudinal lever 26a is connected to the transverse lever 26b at a junction E, and the other end B of the longitudinal lever 26a is connected to the rear wheel turning rod 24. The longitudinal lever 26a is connected to the output displacement member 30 at a point A between the ends.

By arranging the displacement transmission member 26 in the manner shown in FIG. 14 and by positioning the output displacement member 30 between the spool 52 and the rear wheel turning rod 24 to conform to the displacement transmission member 26, the displacement of the output displacement member 30 can be amplified by both the longitudinal lever 26a and the transverse lever 26b, whereby the time lag due to the insensitive zone of the hydraulic switching valve 22 can be shortened more effectively. Though, in the embodiments described above, the spool 52 is returned to the balance position by displacing the rear wheel turning rod 24 in the direction opposite to the direction of the displacement of the output displacement member 30, in the embodiment shown in FIG. 14, the spool 52 is returned to the balance position by displacing the rear wheel turning rod 24 in the same direction as the displacement of the output displacement member 30.

Figure 15:
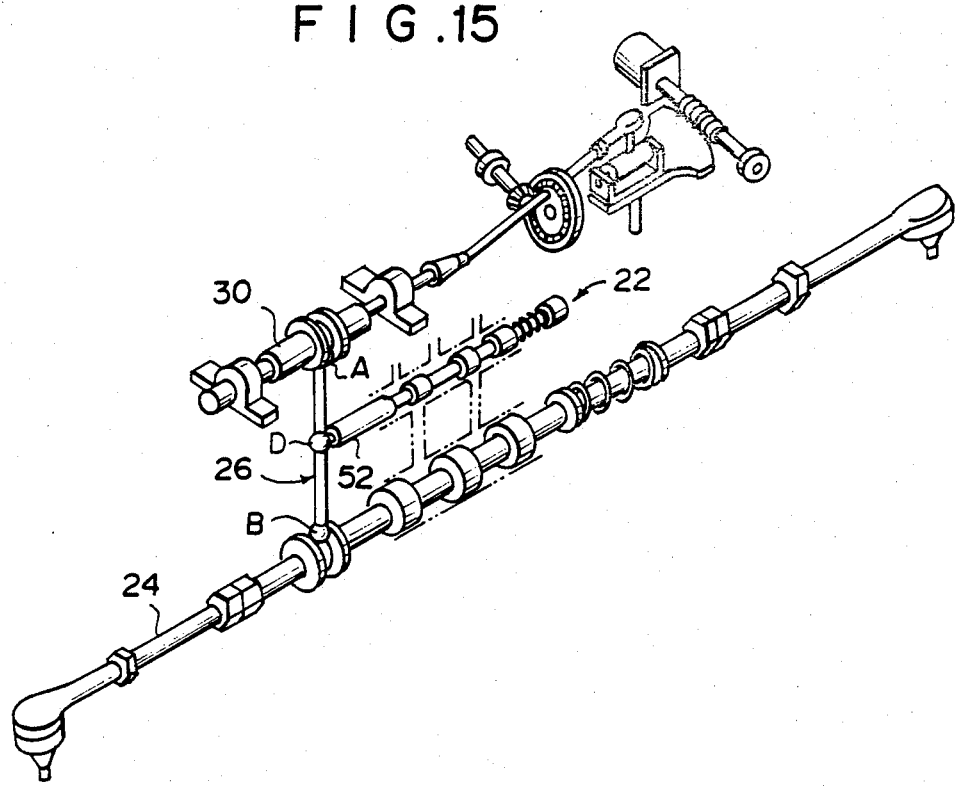
FIG. 15 is a perspective view similar to FIG. 1 but showing a sixth embodiment of the present invention.
Figure 16:
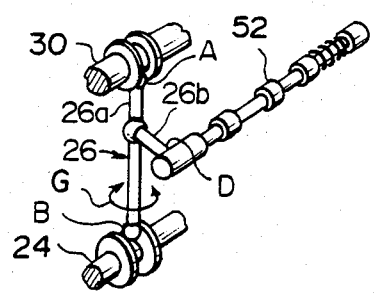
FIG. 16 is fragmentary perspective view showing a seventh embodiment of the present invention.

Though in the embodiments described above, the displacement transmission member 26 has a point (the end C) supported on the casing 70 to be rotatable but not to be displaced, an example of the displacement transmission member 26 which has not such a point is shown in FIGS. 15 and 16.

In the embodiment shown in FIG. 15, the displacement transmission member 26 is in the form of a single lever which is connected to the output displacement member 30 at one end A, to the rear wheel turning rod 24 at the other end B and to the spool 52 at an intermediate point D.

Even such a single lever having no point supported on the casing 70 can be employed in the present invention as the displacement transmission member 26. The displacement transmission member 26 of this type is advantageous in that it is simple in structure and small in size and it facilitates assembly.

In this case, the lever as the displacement transmission member is not supported by the casing, and accordingly, it is necessary to prevent the lever from being disengaged from the output displacement member 30 or the rear wheel turning rod 24. This can be done by connecting the end A or B by way of a ball joint, or by connecting both the ends A and B by way of ball joints and making the lever telescopic.

In another example of the displacement transmission member having no point supported on the casing shown in FIG. 16, a transverse lever 26b is fixed to the longitudinal lever 26a at a portion between the ends A and B, and the spool 52 is connected to the free end D of the transverse lever 26b. In this embodiment, the displacement transmission member 26 should be prevented from being disengaged from the output displacement member 30 or the rear wheel turning rod 24 in the manner described above in conjunction with FIG. 15, and it is further necessary to ensure that the spool 52 is correctly displaced in response to displacement of the output displacement member 30 or the rear wheel turning rod 24, for instance, by providing a means for preventing rotation of the longitudinal lever 26a in the direction of the arrow G.

Figure 17:
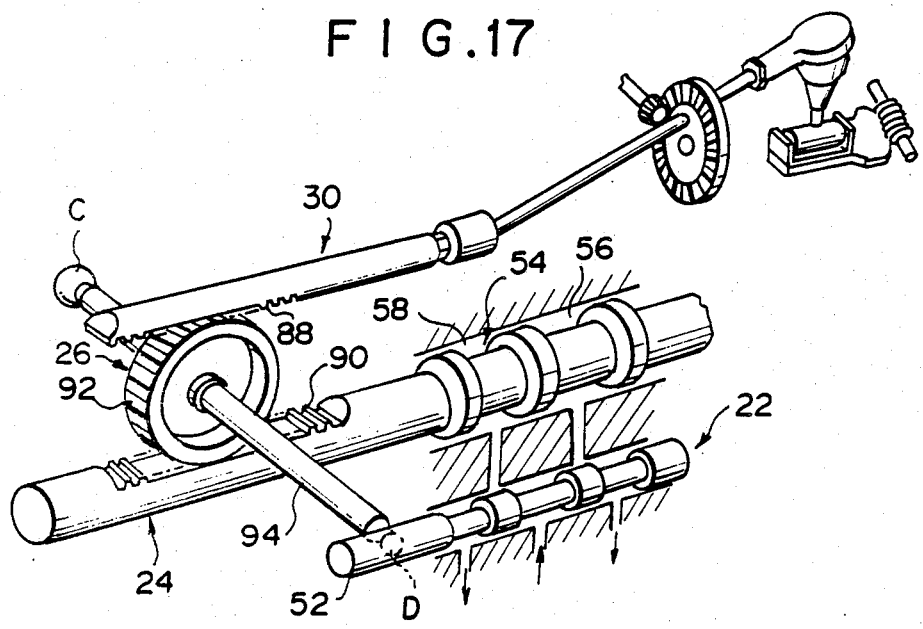
FIG. 17 is a perspective view similar to FIG. 1 but showing a eighth embodiment of the present invention.

In the embodiment shown in FIG. 17, the displacement transmission member 26 comprises a gear 92 and a lever 94. The output displacement member 30 and the rear wheel turning rod 24 are respectively provided with racks 88 and 90, and the gear 92 is engaged with the racks 88 and 90. The lever 94 is passed through the center of the gear 92 and one end C of the lever 92 is connected to the casing 70 by way of a ball joint to be rotatable but not to be displaced. The other end D of the lever 94 is connected to the spool 52 in the manner described above in conjunction with the embodiment shown in FIG. 6.

In this embodiment, assuming that the output displacement member 30 is displaced rightward in FIG. 17, the gear 92 moves rightward by the amount of displacement of the output displacement member 30 while rotating clockwisely since the rear wheel turning rod 24 cannot be moved due to the external forces acting thereon, and the lever 94 is inclined about the end C while the end D is displaced rightward to displace the spool 52 rightward from the neutral position beyond the balance position. In response to this rightward displacement of the spool 52, the hydraulic pressure is fed to the right oil chamber 56 of the hydraulic power cylinder 54 and the hydraulic pressure in the left oil chamber 58 is released, whereby the rear wheel turning rod 24 is displaced leftward in FIG. 17. When the rear wheel turning rod 24 is displaced leftward, the gear 92 is displaced leftward while rotating clockwise since the output displacement member 30 cannot be moved due to the external forces such as the steering wheel turning force as described above, and the end D of the lever 94 is displaced leftward, whereby the spool 52 is displaced to return the balance position. By repeating these operations, the rear wheel turning rod 24 can be displaced by an amount corresponding to the amount of displacement of the output displacement member 30 while the spool 52 is displaced only by a very small amount between the neutral position and the balance position as in the embodiments in which the lever type displacement transmission member 26 is employed.

Also in this embodiment, the hydraulic switching valve 22 and the hydraulic power cylinder 54 can be formed to oppose each other and the oil passages can be directly formed in the casing 70 as in the embodiment shown in FIG. 6. Further, the displacement of the output displacement member 30 can be amplified by the lever 94. That is, by passing the lever 94 through the gear 92 at a portion upwardly offset from the center of the gear 92, the rear wheel turning rod 24 can be displaced by a larger amount than the displacement of the output displacement member 30. Further, the end C connected to the casing 70 may be eliminated to simplify the structure.

Figure 18:
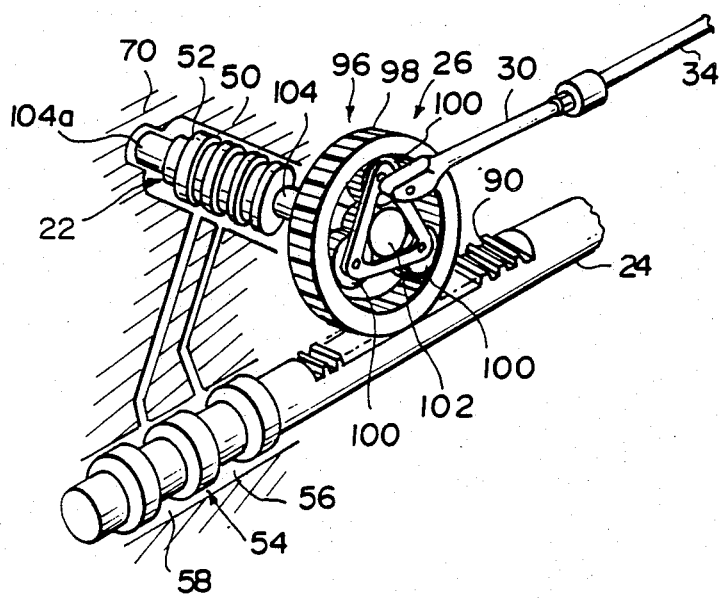
FIG. 18 is a perspective view similar to FIG. 1 but showing a ninth embodiment of the present invention.

In the embodiment shown in FIG. 18, the displacement transmission member 26 comprises a planetary gear system, and the hydraulic switching valve 22 is of a rotary type.

The displacement transmission member 26 comprises a ring gear 98, planetary gears 100 and a sun gear 102. The output displacement member 30 is connected to the connecting rod 34 at one end end by way of a ball joint and to the planetary gears 100 at the other end as shown in FIG. 18. The ring gear 98 is in mesh with a rack 90 formed on the rear wheel turning rod 24, and the sun gear 102 is fixed to one end of a torsion bar 104 the other end 104a of which is connected to the casing 70 not to be rotated. A rotor 52 as the valve member is formed on the torsion bar 104. When the rotor 52 is rotated in one direction from the neutral position relative to the housing 50, the hydraulic pressure is fed to one of the oil chambers 56 and 58 of the hydraulic power cylinder 54, and when the rotor 52 is rotated in the other direction, the hydraulic pressure in fed to the other oil chamber.

In this embodiment, when the output displacement member 30 is displaced rightward, for instance, the planetary gear 100 moves clockwisely around the sun gear 102 while counterclockwisely rotating about its axis since the rear wheel turning rod 24 cannot be moved due to the external forces acting thereon as described above, and the sun gear 102 rotates clockwisely. By the clockwise rotation of the sun gear 102, the rotor 52 is displaced in rotation in the clockwise direction from the neutral position beyond the balance position, whereby the hydraulic pressure is fed to the right oil chamber 56 with the hydraulic pressure in the left oil chamber 58 released and the rear wheel turning rod 24 is displaced leftward. Though the ring gear 98 is rotated in the clockwise direction in response to the leftward displacement of the rear wheel turning rod 24, the planetary gear 100 does not move around the sun gear 102 but rotates about its axis since the output displacement member 30 is held by the steering force turning force and the like. Accordingly the sun gear 102 is displaced in rotation in the counterclockwise direction and the rotor 52 is displaced in rotation in the counterclockwise direction to the balance position. By repeating these operations, the rear wheel turning rod 24 can be displaced by an amount corresponding to the amount of displacement of the output displacement member 30 while the rotor 52 is displaced in rotation only by a very small amount between the neutral position and the balance position as in the embodiments in which the lever type displacement transmission member 26 is employed.

In this embodiment, the rear wheel turning rod 24 can be displaced by a larger amount than the displacement of the output displacement member 30 by selecting the gear ratios of the gears 98, 100 and 102.

Figure 19:
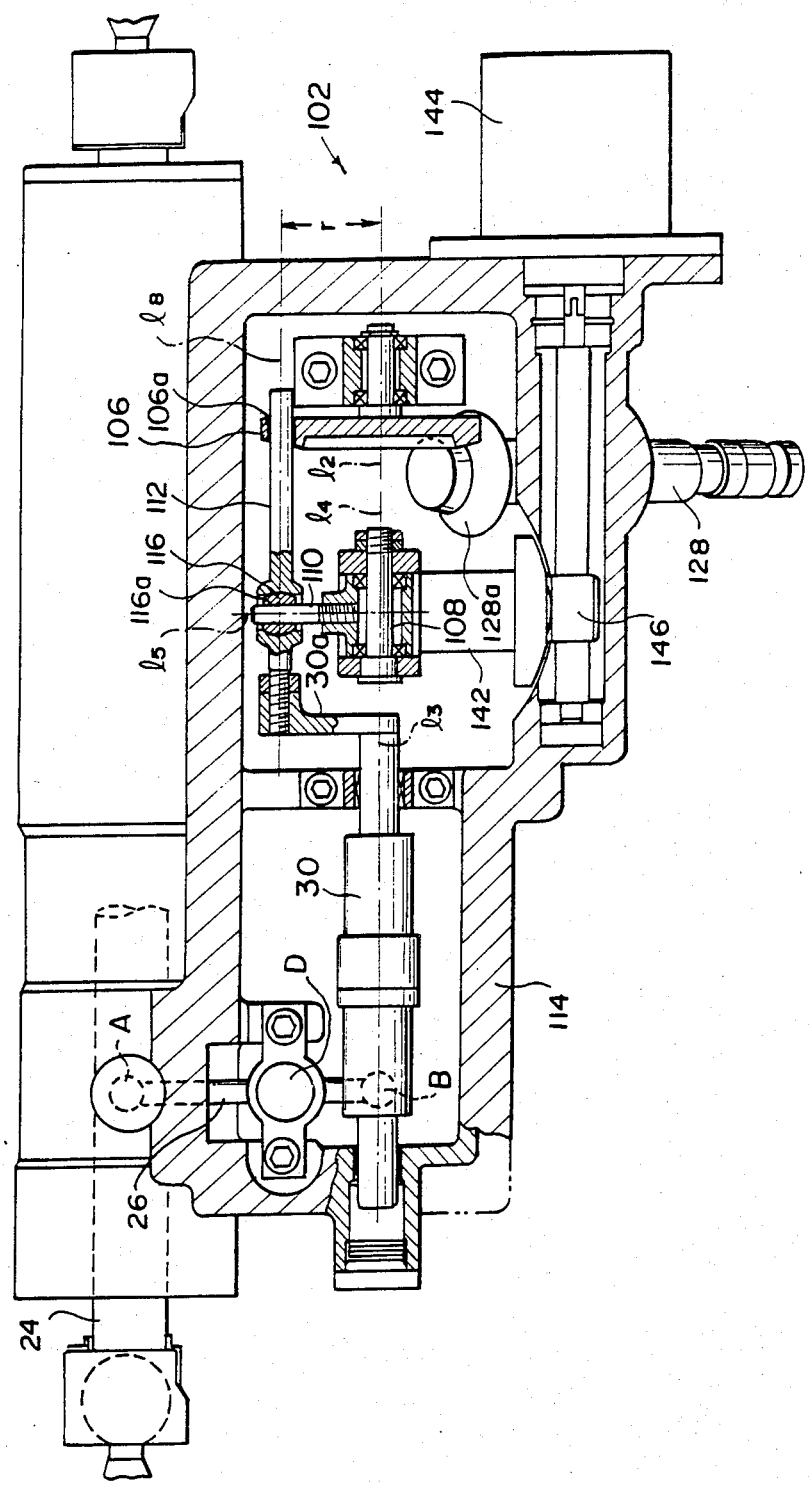
FIG. 19 is a cross-sectional view showing a modification of the rear wheel steering ratio changing mechanism.

FIG. 19 shows a modification of the rear wheel steering ratio changing mechanism which can be employed in the steering system of the present invention.

In FIG. 19, the rear wheel steering ratio changing mechanism 102 of this modification comprises an output displacement member 30, a bevel gear 106, a pivot shaft 108, a swinging arm 110 and a connecting rod 112 accommodated in a casing 114.

The output displacement member 30 is supported on the casing 114 for sliding movement in the longitudinal axis $l_3$, and the rear wheel turning rod 24 is displaced in the transverse direction of the vehicle body by way of a displacement transmission member 26 in response to axial displacement of the output displacement member 30. The bevel gear 106 is supported on the casing 114 for rotation about its central axis $l_2$ which is in alignment with the longitudinal axis $l_3$ of the output displacement member 30. The bevel gear 106 is in mesh with a pinion 128a on an input shaft 129 which is revolved in response to operation of the steering wheel 1.

The pivot shaft 108 has a longitudinal axis $l_4$ which can be in alignment with the longitudinal axis $l_3$ of the output displacement member 30 as shown in FIG. 19 and is fixed to a gear member 142. The gear member 142 is rotated by a stepping motor 144 by way of a worm 146 about a rotational axis which intersects the longitudinal axis $l_4$ in perpendicular to the paper surface of FIG. 19, and the pivot shaft 108 is rotated together with the gear member 142. The swinging arm 110 is connected to the pivot shaft 108 to be rotatable about the longitudinal axis $l_4$ of the pivot shaft 108, and the junction of the swinging arm 110 is determined so that the longitudinal axis $l_5$ thereof passes the intersection of the rotational axis of the pivot shaft 108 and the longitudinal axis $l_4$ of the pivot shaft 108.

The connecting rod 112 has a longitudinal axis $l_8$ which is in parallel to the longitudinal axis $l_3$ of the output displacement member 30, and is connected to the output displacement member 30, the bevel gear 106 and the swinging arm 110. The connecting rod 112 is connected to the output displacement member 30 by screwing one end of the connecting rod 112 into a lever 30a fixed to one end of the output displacement member 30, and is connected to the bevel gear 106 by fitting the other end of the connecting rod in a hole 106a which is formed in the bevel gear 106 at a distance of r from the central axis $l_2$ thereof, and is connected to the swinging arm 110 by fitting the swinging arm 110 in a hole 116a of a ball joint member 116 provided at an intermediate portion of the connecting rod 112 to be movable in any direction. Accordingly, the connecting rod 112 is slidable with respect to the bevel gear 106 in the direction of the longitudinal axis $l_8$ which is parallel to the longitudinal axis $l_3$ though being fixed to the output displacement member 30 Further, the connecting rod 112 is slidable with respect to the swinging arm 110 in the direction of the longitudinal axis $l_5$ (the direction perpendicular to the longitudinal axis $l_3$ in the illustrated state). The longitudinal axis $l_5$ of the swinging arm 110 is inclined with respect to the direction perpendicular to the longitudinal axis $l_3$ by rotation of the pivot shaft 108, and the swinging arm 110 comes to slide in the inclined direction. However, still in this state, a sliding component in the direction perpendicular to the longitudinal axis $l_3$ is included and the change in the angle between the longitudinal axis $l_5$ and the longitudinal axis $l_8$ is absorbed. Accordingly, the component perpendicular to the longitudinal axis $l_3$ in the force transmitted to the connecting rod 112 from the swinging arm 110 is absorbed at the junction of the connecting rod 112 and the swinging arm 110, thereby permitting movement of the connecting rod 112 with respect to the swinging arm 110 in the direction perpendicular to the longitudinal axis $l_3$.

Since the swinging arm 110 and connecting rod 112 are connected to permit their movement in the direction perpendicular to the longitudinal axis $l_3$ relative to each other, the junction of the swinging arm 110 and the connecting rod 112 moves, upon rotation of the swinging arm 110, along a circle or ellipse on the periphery of a cylinder which has its central axis in alignment with the longitudinal axis $l_3$ and the radius of which is r.

Figure 20:
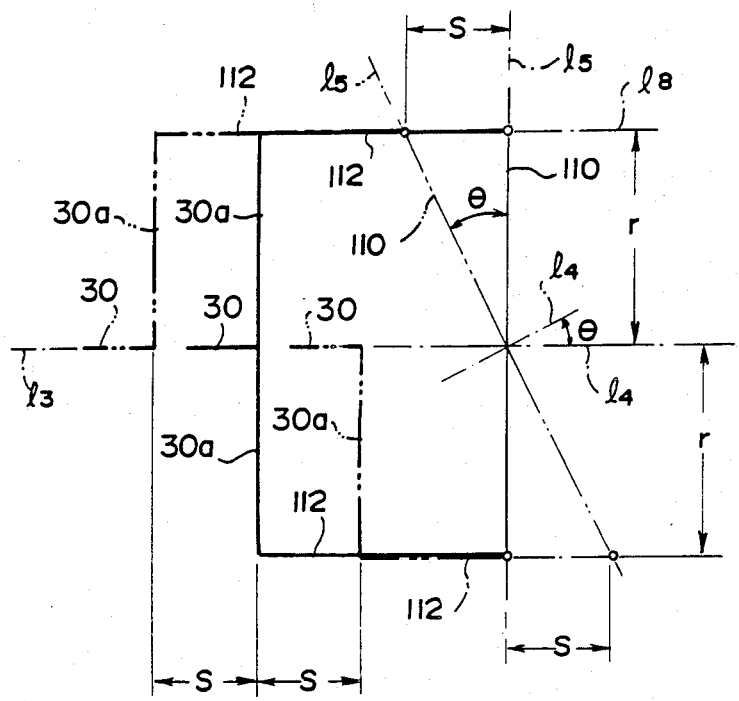
FIGS. 20 and 21 are views for illustrating the principle of operation of the rear wheel steering ratio changing mechanism.

FIG. 20 shows displacement of the output displacement member 30 when the longitudinal axis $l_4$ of the pivot shaft 108 is inclined by an angle $\theta$ with respect to the longitudinal axis $l_3$ of the output displacement member 30 (i.e., when the longitudinal axis $l_5$ of the swinging arm 110 is inclined by an angle $\theta$ with respect to the direction perpendicular to the longitudinal axis $l_3$). As can be understood from FIG. 20, the amount of displacement S of the junction of the swinging arm 110 and the connecting rod 112 for a given amount of displacement of the swinging arm 110 is constant irrespective of the direction of the displacement.

Figure 21:
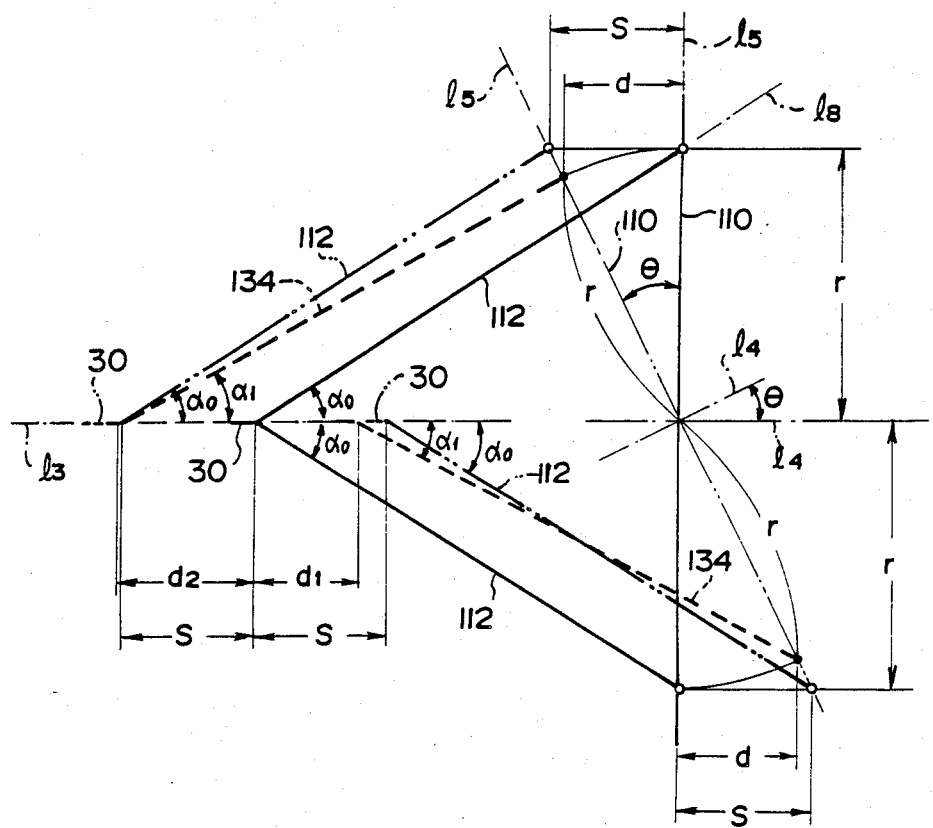

Such a property can be obtained not only when the longitudinal axis $l_8$ of the connecting rod 112 is parallel to the longitudinal axis $l_3$ of the output displacement member 30 but also when the angle between the longitudinal axis $l_8$ of the connecting rod 112 and the longitudinal axis $l_3$ of the output displacement member 30 is constant even if the axes are not parallel. FIG. 21 shows the fact that the output displacement member 30 is displaced by the same amount irrespective of the direction of the displacement of the swinging arm 110 even when the angle between the longitudinal axis $l_8$ of the connecting rod 112 and the longitudinal axis $l_3$ of the output displacement member 30 is an acute angle $\alpha_0$. That is, said angle can be the acute angle $\alpha_0$ and constant by virtue of the fact that the swinging arm 110 is connected to the connecting rod 112 to permit relative movement in the direction perpendicular to the longitudinal axis $l_3$ of the output displacement member 30. With such a connection, the junction of the swinging arm 110 and the connecting rod 112 moves, upon rotation of the swinging arm 110, along a circle or ellipse on the periphery of a cylinder which has its central axis in alignment with the longitudinal axis $l_3$ and the radius of which is r, and the displacement of the junction S in the direction of the longitudinal axis $l_3$ becomes the displacement of the output displacement member 30 in the direction the longitudinal axis $l_3$, thereby making uniform the displacement of the output displacement member 30 irrespective of the direction of the displacement of the swinging arm 110.

In FIG. 21, displacement of the connecting rod 34 in the embodiment shown in FIG. 1 is shown by broken line. In the case of the connecting rod 34, the angle $\alpha_1$ between the axis of the connecting rod 34 and the longitudinal axis $l_3$ of the output displacement member 30 when the angle $\theta$ is not equal to 0 differs from that $\alpha_0$ when the angle $\theta$ is equal to 0 ($\alpha_1 < \alpha_0$) since the junction of the swinging arm 110 and the connecting rod 112 is at a fixed distance r. Accordingly, the displacement of the output displacement member 30 in the direction of the longitudinal axis $l_3$ for a given displacement d of the junction changes according to the direction of the displacement of the swinging arm 110 ($d_2 > d > d_1$).

As can be understood from the description above, by connecting the swinging arm 110 and the connecting rod 112 to be movable relative to each other in the direction perpendicular to the longitudinal axis $l_3$ of the output displacement member 30, the angle $\alpha$ between the longitudinal axis $l_8$ of the connecting rod 112 and the longitudinal axis $l_3$ of the output displacement member 30 can be fixed, whereby the amount of displacement of the output displacement member 30 for a given amount of displacement of the connecting rod 112 can be made constant irrespective of the direction of the displacement of the swinging arm 110. By setting the angle $\alpha$ to 0° ($l_3 | | l_8$) as in this example, the rear wheel steering ratio changing mechanism 102 can compactly arranged. The longitudinal axis $l_8$ of the connecting rod 112 need not be straight but may be a curve or a broken line.

The same effect can be enjoyed in the modifications of the rear wheel steering ratio changing mechanism respectively shown in FIGS. 22 and 23. In the modification shown in FIG. 22, the position of the connection of the bevel gear 106 to the connection rod 112 and the position of the connection of the swinging arm 110 to the connecting rod 112 are changed. In the modification shown in FIG. 23, the lever 30a of the output displacement member 30 is connected to the connecting rod 112 at a portion between the connection of the bevel gear 106 to the connecting rod 112 and the connection of the swinging arm 110 to the connecting rod 112, whereby the bevel gear 106 and the output displacement member 30 are supported together by the casing 114.

Though, in the embodiments described above, the present invention is applied to the rear wheel steering system in the four-wheel-steered vehicle, the present invention can also be applied to a rear wheel steering system for turning the rear wheels independently from the front wheels or a front wheel steering system for turning the front wheels independently from the rear wheels Further, the hydraulic power cylinder 54 need not be limited to those described above, but may be of any other type so long as it has a valve member which is displaced from the neutral position in one direction to feed the hydraulic pressure to one of the oil chambers of the hydraulic power cylinder and in the other direction to feed the hydraulic pressure to the other oil chamber. Further, the displacement of the valve member may be an axial displacement, rotational displacement or any other displacement.

We claim:

1. A steering system for a vehicle comprising
    a wheel turning rod which is displaced to turn wheels connected thereto,
    a hydraulic power cylinder means which has first and second oil chambers for exerting a hydraulic pressure on the wheel turning rod for displacing the wheel turning rod in one direction when a hydraulic pressure is fed to the first oil chamber and for exerting a hydraulic pressure on the wheel turning rod for displacing the wheel turning rod in the other direction when a hydraulic pressure is fed to the second oil chamber,
    a hydraulic switching valve having a valve housing and a valve member slidably disposed in the valve housing and which is displaced with respect tot he valve housing from a neutral position in one direction to feed the hydraulic pressure to the first oil chamber of the hydraulic power cylinder means, and in the other direction to feed the hydraulic pressure to the second oil chamber of the hydraulic power cylinder means,
    a steering ratio changing mechanism which has an output displacement member which is displaced in response to operation of a steering wheel, and which can change a steering ratio which is the ratio of the amount of displacement of the output displacement member to the degree of turning of the steering wheel, and
    a displacement transmission means which is operatively connected to the output displacement member, the valve member and the wheel turning rod for displacing the valve member in a predetermined direction in response to a displacement of the output displacement member as controlled by the steering ratio changing mechanism and for subsequently displacing the valve member in the direction opposite to the predetermined direction in response to a displacement of the wheel turning rod generated by the hydraulic power cylinder means caused by the preceding displacement of the valve member, so that the wheel turning rod is displaced in response to displacement of the output displacement member with the valve member being hardly displaced.

2. A steering system for a vehicle as defined in claim 1 in which said displacement transmission means comprises a level member.

3. A steering system for a vehicle as defined in claim 2 in which said lever member is a cross lever comprising a longitudinal level and a transverse lever connected together, the longitudinal lever having first and second ends the first end being operatively connected to the output displacement member not to be movable with respect to the output displacement member in the direction of the displacement of the output displacement member but to the rotatable and to be movable in the other directions, the second end being operatively connected to the wheel turning rod not to be movable with respect to the wheel turning rod in the direction of the displacement of the wheel turning rod but to be rotatable and to movable in the other directions, and the transverse lever having a third end operatively connected to the valve member not to be movable with respect to the valve member in the direction of the displacement of the valve member but to be rotatable and to be movable in the other directions.

4. A steering system for a vehicle as defined in claim 3 in which said transverse lever has a fourth end connected to a casing of the system to be rotatable but not to be movable with respect to the casing.

5. A steering system for a vehicle as defined in claim 4 in which the length between the junction of the longitudinal lever and the transverse lever is shorter than the length between the junction and the second end.

6. A steering system for a vehicle as defined in claim 2 in which said lever member is a T-shaped lever member comprising a longitudinal lever and a transverse lever connected to the longitudinal lever at one end, the longitudinal lever having first and second ends the first end being operatively connected to the output displacement member not to be movable with respect to the output displacement member in the direction of the displacement of the output displacement member but to be rotatable and to be movable in the other directions, the second end being operatively connected to the wheel turning rod not to be movable with respect to the wheel turning rod in the direction of the displacement of the wheel turning rod but to be rotatable and to be movable in the other directions, and the other end of the transverse lever being operatively connected to the valve member not to be movable with respect to the valve member in the direction of the displacement of the valve member but to be rotatable and to be movable in the other directions.

7. A steering system for a vehicle as defined in claim 2 in which said lever member is a single rod-shaped lever member having first and second ends the first end being operatively connected to the output displacement member not to be movable with resect to the output displacement member int he direction of the displacement of the output displacement member but to be rotatable and to be movable in the other directions, the second end being operatively connected to the wheel turning rod not to be movable with respect to the wheel turning rod in the direction of the displacement of the wheel turning rod but to be rotatable and to be movable in the other directions, and the lever being operatively connected to the valve member at an intermediate portion not to be movable with respect to the valve member in the direction of the displacement of the valve member but to be rotatable and to movable in the other directions.

8. A steering system for a vehicle as defined in claim 1 in which said displacement transmission means comprises a gear portion and a lever operatively connected to the gear portion, the gear portion being in mesh with racks respectively formed on the output displacement member and the wheel turning rode, the lever being operatively connected to the valve member at one end not to be movable with respect to the valve member in the direction of the displacement of the valve member but to be rotatable and to be movable in the other directions.

9. A steering system for a vehicle as defined in claim 8 in which said lever is connected to the gear portion at a position nearer to the output displacement member than to the wheel turning rod so that the displacement of the output displacement member is amplified when it is transmitted to the wheel turning rod.

10. A steering system for a vehicle as defined in claim 1 in which said displacement transmission means comprises a planetary gear system defined by a ring gear having outer teeth in mesh with a rack formed on the wheel turning rod, and a planetary gear in mesh with both a sun gear and inner teeth of the ring gear and connected to the output displacement member, and the sun gear being connected to the valve member which is of a rotary type.

11. A steering system for a vehicle as defined in claim 1 in which said displacement transmission means is arranged so that the displacement of the wheel turning rod in response to a displacement of the output displacement member becomes larger than the displacement of the output displacement member.

12. A steering system for a vehicle as defined in claim 1 in which said valve member is a spool.

13. A steering system for a vehicle as defined in claim 1 in which said wheel turning rod extends in the transverse direction of the vehicle body and the output displacement member is displaced substantially in the longitudinal direction of the wheel turning rod.

14. A steering system for a vehicle as defined in claim 13 in which said output displacement member is a rod-like member extending in the transverse direction of the vehicle body.

15. A steering system for a vehicle as defined in claim 1 in which said wheel turning rod turns rear wheels of the vehicle.

16. A steering system for a vehicle as defined in claim 15 in which said steering ratio changing mechanism includes a rotational input shaft for transmitting the steering wheel turning force to the steering ratio changing mechanism.

17. A steering system for a vehicle as defined in claim 15 in which said steering ratio changing mechanism comprises an output displacement member to be displaced in its longitudinal direction, an input shaft member which has a longitudinal axis in alignment with the longitudinal axis of the output displacement member and is rotated about its longitudinal axis in response to operation of the steering wheel, a pivot shaft member which has a longitudinal axis adapted to be in alignment with the longitudinal axis of the output displacement member and is rotatable about a rotational axis which intersects the longitudinal axis of the output displacement member, a swinging arm member which is connected to the pivot shaft member to be rotatable about the longitudinal axis of the pivot shaft member, and a connecting member which is disposed so that the longitudinal axis thereof is not in alignment with the longitudinal axis of the output displacement member, and is connected to the output displacement member, the input shaft member and the swinging arm member, said swinging arm member being connected to one of the pivot shaft member and the connecting member to permit relative movement in the direction perpendicular to the longitudinal axis of the output displacement member.

18. A steering system for a vehicle as defined in claim 1 in which said hydraulic power cylinder and the hydraulic switching valve are opposed to each other, and the housings for the hydraulic power cylinder and the hydraulic switching valve are defined by the casing of the steering system, the oil passages communicating the hydraulic power cylinder with the hydraulic switching valve being formed in the casing of the steering system.

19. A steering system for a vehicle as defined in claim 1 which further comprises a transmission displacement absorbing mechanism which is provided in the system for transmitting a steering wheel turning force to the wheel turning rod including the steering ratio changing mechanism and the displacement transmission means and absorbs a displacement which is transmitted under load heavier than a predetermined value.

* * * * *